(12) United States Patent
Sato et al.

(10) Patent No.: US 9,722,693 B2
(45) Date of Patent: Aug. 1, 2017

(54) METHOD OF CONTROLLING COMMUNICATION DEVICE, COMMUNICATION DEVICE, AND RECORDING MEDIUM

(71) Applicant: FUJITSU LIMITED, Kawasaki-shi, Kanagawa (JP)

(72) Inventors: Takuya Sato, Yokohama (JP); Eiji Hasegawa, Kawasaki (JP); Manabu Nakao, Kunitachi (JP); Toru Kamiwada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/921,408

(22) Filed: Oct. 23, 2015

(65) Prior Publication Data
US 2016/0191150 A1   Jun. 30, 2016

(30) Foreign Application Priority Data
Dec. 25, 2014  (JP) ................. 2014-263434

(51) Int. Cl.
| | | |
|---|---|---|
| H04B 1/38 | (2015.01) | |
| H04B 1/44 | (2006.01) | |
| H04B 7/00 | (2006.01) | |
| H04B 7/26 | (2006.01) | |
| H04B 1/00 | (2006.01) | |

(52) U.S. Cl.
CPC .............. *H04B 7/26* (2013.01); *H04B 1/005* (2013.01)

(58) Field of Classification Search
CPC ..................................................... H04L 45/70
USPC .................................................... 455/83, 70
See application file for complete search history.

(56) References Cited

U.S. PATENT DOCUMENTS

| | | | | |
|---|---|---|---|---|
| 6,792,052 B1* | 9/2004 | Johansson | ............... | H04B 7/005 375/340 |
| 6,823,196 B1* | 11/2004 | Itoh | ........................ | H04W 88/06 455/83 |
| 2007/0195722 A1* | 8/2007 | Hiramoto | ............... | H04B 15/06 370/318 |
| 2009/0233569 A1* | 9/2009 | Wakutsu | ................ | H04B 15/00 370/338 |
| 2010/0091657 A1* | 4/2010 | Tsfaty | ............... | H04W 52/0296 370/241 |

(Continued)

FOREIGN PATENT DOCUMENTS

| | | |
|---|---|---|
| JP | 63-301627 | 12/1988 |
| JP | 4-120920 | 4/1992 |
| JP | 2005-184606 | 7/2005 |

*Primary Examiner* — Tilahun B Gesesse
(74) *Attorney, Agent, or Firm* — Staas & Halsey LLP

(57) ABSTRACT

A method of controlling a communication device executed by a processor included in the communication device, the method includes intermittently receiving, via a receiver of the communication device, at least two radio signals intermittently sent from a sending device; specifying a sending interval between the at least two radio signals, based on the at least two radio signals; and controlling the receiver so as to cause the receiver to be set, at each of timings at which a plurality of radio signals intermittently sent after the at least two radio signals from the sending device are received, to be in an operating state where the receiver is capable of receiving the plurality of radio signals, based on the specified sending interval.

17 Claims, 23 Drawing Sheets

(56) References Cited

U.S. PATENT DOCUMENTS

2013/0005347 A1\* 1/2013 Curticapean .......... H04W 64/00
  455/456.1
2013/0223303 A1\* 8/2013 Nakakuki .............. G08G 1/094
  370/310

\* cited by examiner

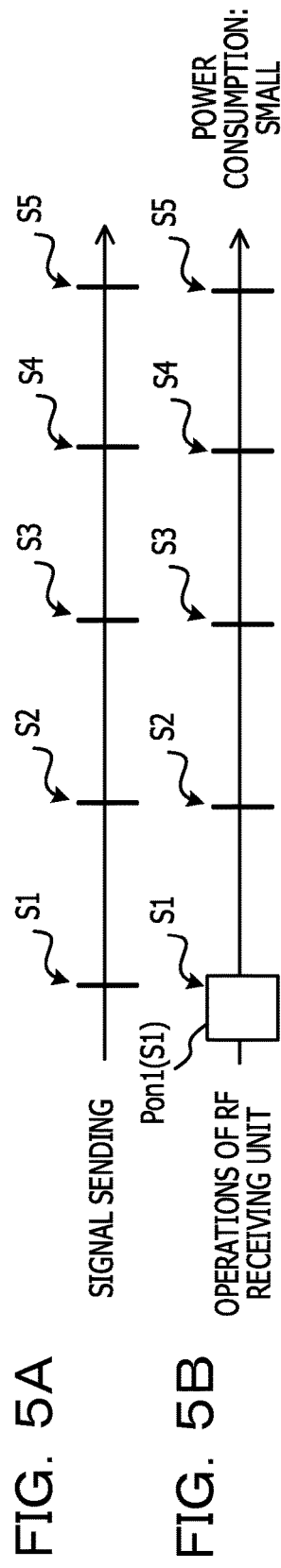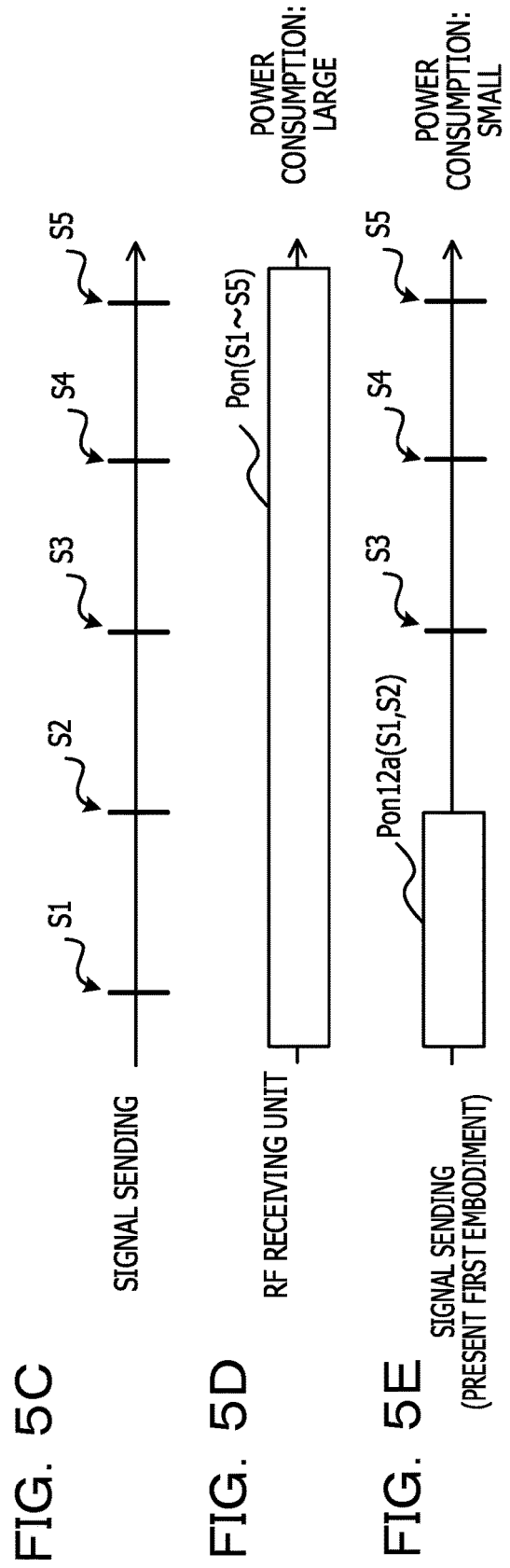

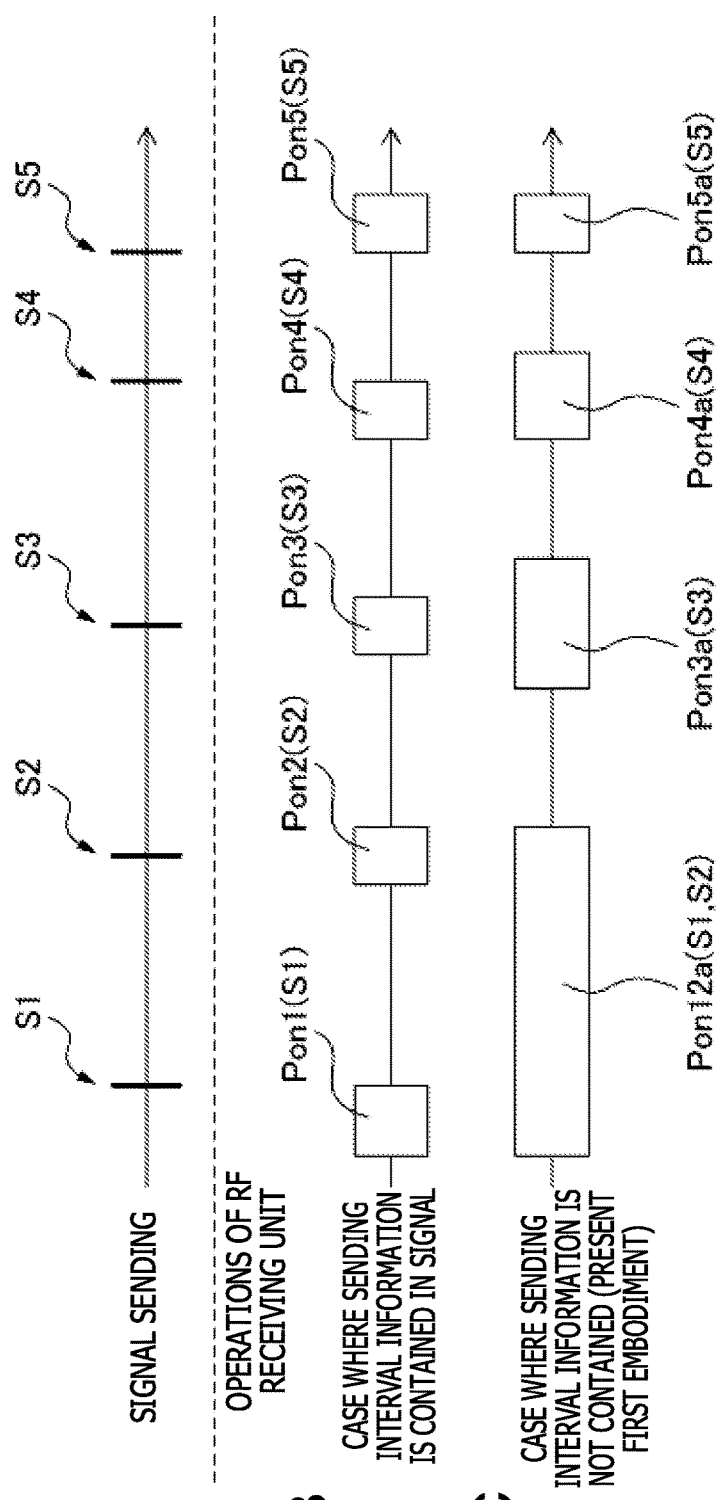

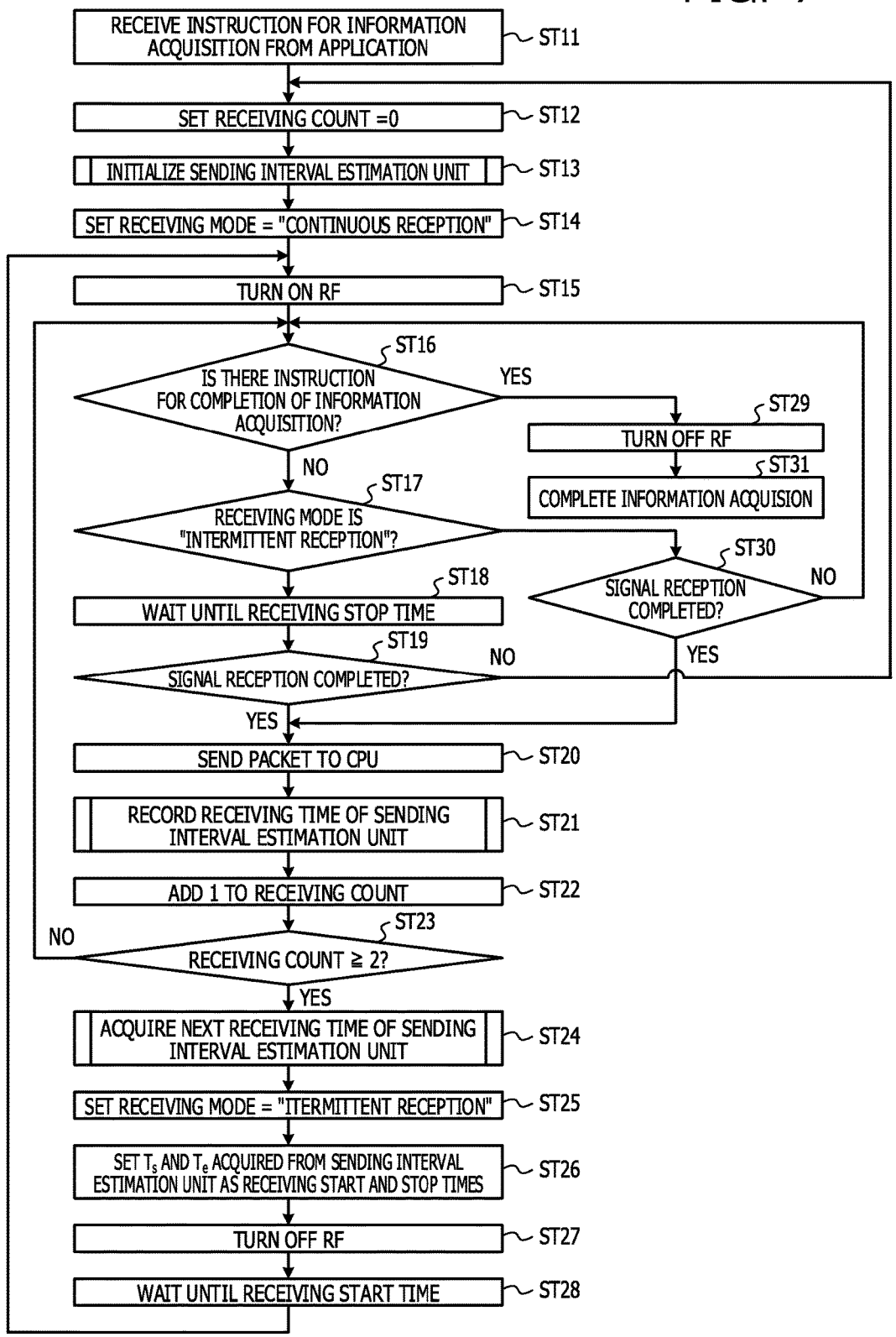

FIG. 8

| TYPE | NAME | VALUE |
|------|------|-------|
| LONG | $T_s$ | RECEIVING START TIME |
| LONG | $T_e$ | RECEIVING STOP TIME |

RECEIVING TIME RECORDING

NEXT RECEIVING TIME ACQUIRING

FIG. 11

CONSTANT

| TYPE | NAME | VALUE |
|---|---|---|
| LONG | $T_p$ | PERIOD OF TIME TAKEN FOR PACKET RECEPTION |

VAIABLE HELD

| TYPE | NAME | VALUE |
|---|---|---|
| LONG | $T_1$ | ONE-TIME PRECEDING RECEIVING TIME |
| LONG | $T_0$ | LATEST RECEIVING TIME |

TEMPORARY VARIABLE

| TYPE | NAME | VALUE |
|---|---|---|
| LONG | $T_i$ | RECEIVING INTERVAL |
| LONG | $T_s$ | RECEIVING START TIME |
| LONG | $T_e$ | RECEIVING STOP TIME |

RECEIVING TIME RECORDING

FIG. 15

CONSTANT

| TYPE | NAME | VALUE |
|---|---|---|
| LONG | $T_d$ | SHIFT WIDTH OF SENDING INTERVAL |
| LONG | $T_p$ | PERIOD OF TIME TAKEN FOR PACKET RECEPTION |

VAIABLE HELD

| TYPE | NAME | VALUE |
|---|---|---|
| LONG | $T_1$ | ONE-TIME PRECEDING RECEIVING TIME |
| LONG | $T_0$ | LATEST RECEIVING TIME |
| LONG | $T_{max}$ | RECEIVING INTERVAL MAXIMUM VALUE |
| LONG | $T_{min}$ | RECEIVING INTERVAL MINIMUM VALUE |

TEMPORARY VARIABLE

| TYPE | NAME | VALUE |
|---|---|---|
| LONG | $T_i$ | RECEIVING INTERVAL |
| LONG | $T_s$ | RECEIVING START TIME |
| LONG | $T_e$ | RECEIVING STOP TIME |

FIG. 19

VAIABLE HELD

| TYPE | NAME |
|---|---|
| STRING | WALKING STATE |

TEMPORARY VARIABLE

| TYPE | VALUE |
|---|---|
| LONG | RECEIVING START TIME |
| LONG | RECEIVING STOP TIME |
| STRING | RECEIVING MODE |
| STRING | RECEIVING COUNT |

METHOD OF CONTROLLING COMMUNICATION DEVICE, COMMUNICATION DEVICE, AND RECORDING MEDIUM

CROSS-REFERENCE TO RELATED APPLICATION

This application is based upon and claims the benefit of priority of the prior Japanese Patent Application No. 2014-263434, filed on Dec. 25, 2014, the entire contents of which are incorporated herein by reference.

FIELD

The embodiments discussed herein are related to a method of controlling a communication device, a communication device, and a recording medium.

BACKGROUND

Recently, information services for delivering electronic information have been increasingly used in various fields. For example, using information about locations, services may be provided to a person at a particular location.

For example, as a technique to determine whether or not a user is at a location where a service is provided, a beacon sending device is installed at the location where the service is provided. A receiving device (a communication device) carried by the user continuously searches for a beacon. If a beacon from the sending device is received, the receiving device determines that the sending device has arrived at the location. Additionally, if the receiving device carried by the user has become unable to receive a beacon from the sending device, the receiving device determines that the sending device has left that location.

Specifically, with iBeacon (registered trademark), a terminal (a receiving device, a communication device) of the user continuously searches for a beacon. When the terminal of the user receives a beacon from a beacon sending device installed at a location where a service is provided, the service is provided, and, when the terminal has become unable to receive a beacon, the service provision is stopped.

The beacon sending device intermittently sends signals. For this reason, the receiving device, upon receiving beacons from a sending device installed at a location where a service is provided, may control radio frequency (RF) receiving unit if the sending intervals of the beacons are detected.

That is, the receiving device causes the RF receiving unit, which receives a radio signal, to be in the operating state (ON) at a timing at which a beacon is sent, and to be in the stopped state (OFF) after completion of signal reception. This enables the power consumption to be reduced.

Various proposals have been offered as reception control techniques for receiving beacons intermittently sent from a beacon sending device. As related art techniques, for example, Japanese Laid-open Patent Publication No. 2005-184606, Japanese Laid-open Patent Publication No. 63-301627, and Japanese Laid-open Patent Publication No. 4-120920 are disclosed.

As described above, for example, as a receiving device, a device in which the RF receiving unit is caused to be ON at a timing at which a beacon is sent and to be OFF after completion of signal reception, thereby reducing the power consumption, has been devised.

However, in some beacon sending devices, information on sending intervals are not contained in the signals sent, or the sending intervals vary. To receive every one of the signals received from such a beacon sending device, the RF receiving unit has to remain ON. As a result, a problem arises in that power consumption of the receiving device increases.

To quickly determine that the receiving device has left from a location for service provision, it is desirable that every one of the signals intermittently sent by the beacon sending device be received. However, the receiving device does not necessarily cause the RF receiving unit to be ON when the beacon sending device is sending signals.

Therefore, a problem arises in that signals sent when the RF receiving unit is OFF are not received, lengthening the time taken to detect that the receiving device has left from a location for service provision. Furthermore, another problem arises in that the RF receiving unit is ON even when the sending device is not sending a signal, resulting in wasteful power consumption.

SUMMARY

According to an aspect of the invention, a method of controlling a communication device executed by a processor included in the communication device, the method includes intermittently receiving, via a receiver of the communication device, at least two radio signals intermittently sent from a sending device; specifying a sending interval between the at least two radio signals, based on the at least two radio signals; and controlling the receiver so as to cause the receiver to be set, at each of timings at which a plurality of radio signals intermittently sent after the at least two radio signals from the sending device are received, to be in an operating state where the receiver is capable of receiving the plurality of radio signals, based on the specified sending interval.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A, FIG. 5B, FIG. 5C, FIG. 5D, and FIG. 5E are diagrams for explaining advantages achieved when sending intervals are fixed;

FIG. 6A, FIG. 6B, and FIG. 6C are diagrams for explaining advantages in the case where sending intervals are not fixed;

FIG. 7 is a flowchart for explaining operations of an RF control unit in the receiving device in the first embodiment;

FIG. 8 is a diagram for explaining a time when receiving starts next time and a time when receiving stops next time in the flowchart illustrated in FIG. 7;

FIG. 11 is a diagram depicting an example of a constant and variables in the flowchart illustrated in FIG. 10A and FIG. 10B;

FIG. 15 is a diagram depicting an example of a constant and variables in the flowchart illustrated in FIG. 14A, FIG. 14B, and FIG. 14C;

FIG. 19 is a diagram depicting an example of constants and a variable in the flowcharts illustrated in FIG. 17 and FIG. 18.

DESCRIPTION OF EMBODIMENTS

Figure 1:
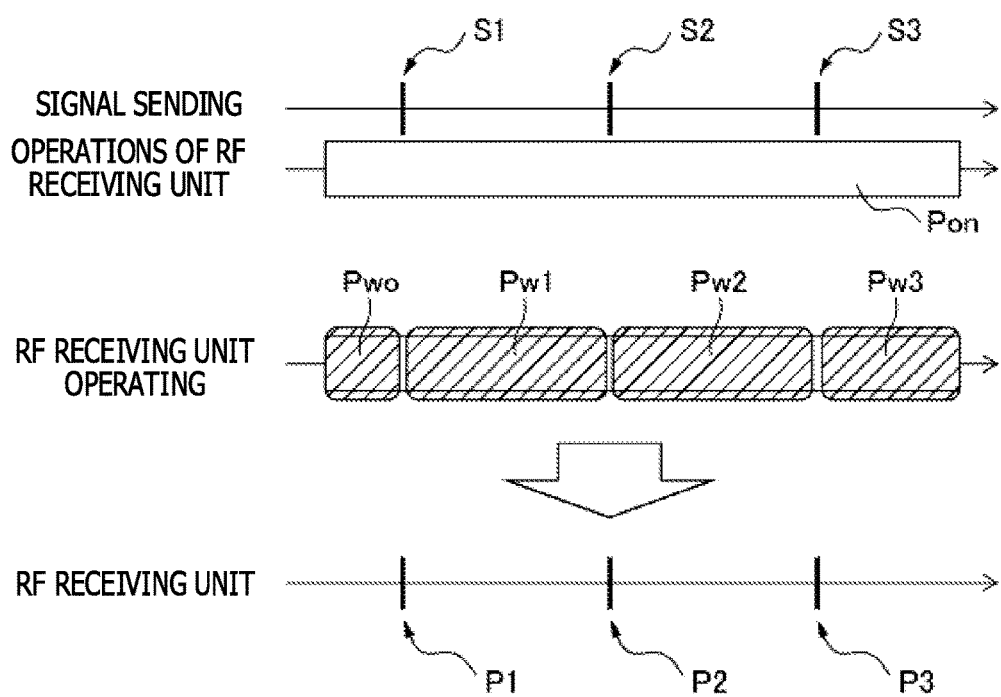
FIG. 1 is a diagram for explaining an example of a reception control method and its issues.

First, prior to detailing a communication device, a method for controlling a communication device, and a control program of the present embodiments, an example of the method for controlling a communication device and its issues will be described with reference to FIG. 1. FIG. 1 is a diagram for explaining an example of a reception control method (a method for controlling a communication device) and its issues.

As illustrated in FIG. 1, when intermittent signals S1, S2, S3, . . . sent from a beacon sending device are received, for example, an RF receiving unit in a receiving device (communication device) continues to be in the on state and consumes power Pon during that time.

However, the RF receiving unit, for example, may be in the on state only at a timing at which an intermittent signal Si is received. That is, the desirable power consumed by the RF receiving unit is only Pi, and other power Pw0, Pw1, Pw2 . . . consumed by the RF receiving unit is wasteful.

In such a manner, since the beacon sending device intermittently sends signals, the receiving device, upon receiving a beacon from the sending device disposed at a location where a service is provided, may control the RF receiving unit if the sending intervals of the beacons are found.

That is, in the receiving device, the RF receiving unit that receives radio signals is set to be in the operating state (ON) at a timing at which a beacon is sent, and is set to be in the stopped state (OFF) after completion of reception. This enables the power consumption to be reduced.

Specifically, with Bluetooth (registered trademark), at the time of establishing coupling, once a device that receives beacons receives a beacon from a device that sends beacons, a coupling request including parameters, such as sending intervals, is issued to the beacon sending device, thereby completing establishment of coupling.

In the receiving device, using information on sending intervals obtained upon establishment of coupling, the RF receiving unit is turned ON at a timing at which a beacon is sent and is turned OFF after the beacon is received, so that the power consumption is controlled while coupling is maintained.

Furthermore, a technique for saving power of reception of radio signals, in which the RF receiving unit that receives radio signals is intermittently turned ON, and the period of time over which the RF receiving unit is OFF is increased with the increasing period of time that has elapsed from the time at which a signal was received last time, so that the power consumption is controlled.

Application of this technique results in that when, under the condition that the RF receiving unit is ON, signal reception is attempted but a signal is not received, the periods of time over which the RF receiving unit of the receiving device is OFF are sequentially lengthened. This makes it possible, for example, to reduce waste of power resulting from the RF receiving unit being ON in a situation where signal reception is difficult, such as where the sending device stops sending or falls out of the receivable range.

However, in some beacons, information on sending intervals is not contained in the signals sent. Even if the receiving device attempts to turn OFF the RF receiving unit after receiving a signal, the receiving device is not able to obtain information on a timing at which receiving device next turns ON the RF receiving unit and therefore continuously sets the RF receiving unit to be ON all the time. As a result, the power consumption of the receiving device increases.

Furthermore, for example, in order to quickly find out that the receiving device (the user) has left a service provision location, it is desirable that every one of the signals intermittently sent from a beacon sending device be received.

However, the receiving device does not perform receiving operations in accordance with sending intervals, and does not necessarily set the RF receiving unit to be ON when the beacon sending device is sending a signal.

Consequently, a signal sent when the RF receiving unit is OFF is not received, which increases the period of time taken to detect that the receiving device has left from a location for service provision. The RF receiving unit could be ON even when the sending device sends no signal, which consumes wasteful power.

In such a manner, for example, it is difficult to quickly detect a signal sent from a beacon sending device as well as to control power consumption.

Figure 2:
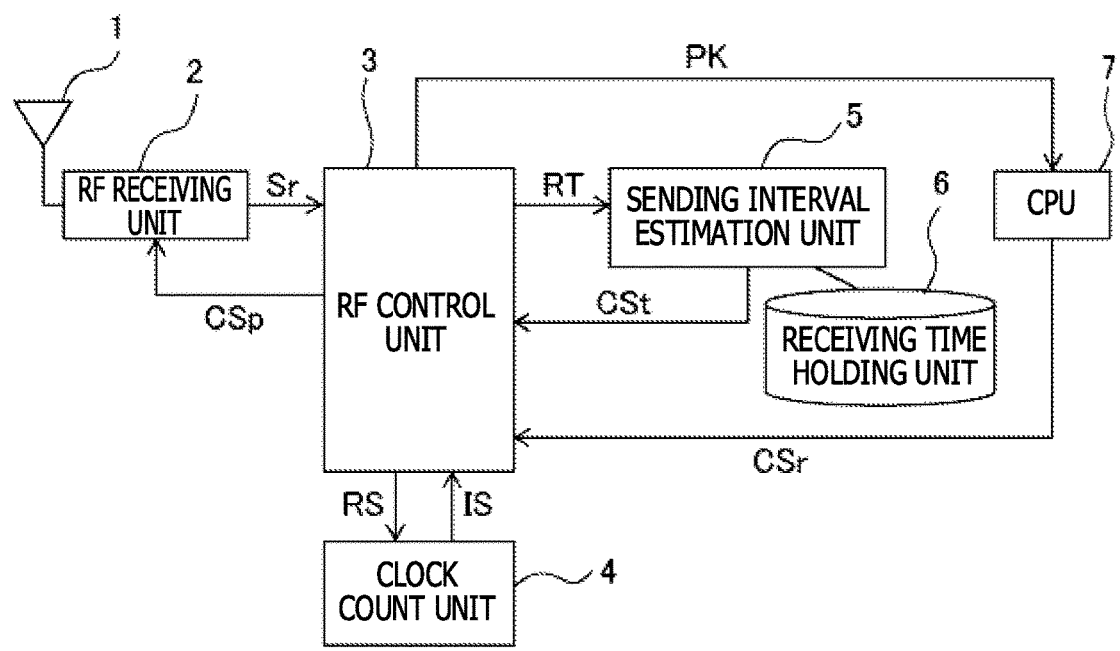
FIG. 2 is a block diagram illustrating a first embodiment of a receiving device.

Hereinafter, embodiments of the communication device, the method for controlling a communication device, and a control program will be described in detail with reference to the accompanying drawings. FIG. 2 is a block diagram illustrating a first embodiment of the receiving device (communication device). As illustrated in FIG. 2, the receiving device in the first embodiment includes an antenna 1, an RF receiving unit 2, an RF control unit 3, a clock count unit 4, a sending interval estimation unit 5, a receiving time holding unit 6, and a central processing unit (CPU) 7.

The RF receiving unit (receiving unit) 2 receives a radio signal (signal) sent from a beacon sending device (not illustrated) via the antenna 1 and outputs a received signal Sr to the RF control unit (control unit) 3. It is to be understood that the RF receiving unit 2 sends and receives various control signals and data via the antenna 1 between the beacon sending device (base station) and the receiving device (terminal).

The CPU 7 executes a reception control program (communication control program) to output a reception control signal CSr for starting or stopping reception to the RF control unit 3. The RF control unit 3 controls start and stop in accordance with instructions from the CPU 7. The RF control unit 3 receives the received signal Sr from the RF receiving unit 2 and outputs a received packet PK to the CPU 7.

The clock count unit 4 receives a time acquisition/timer setting signal RS from the RF control unit 3. The clock count unit 4 counts the number of clock signals generated at a fixed cycle and handles the number as a time. Then, the clock count unit 4 outputs time information/timer notification IS of the time to the RF control unit 3.

The sending interval estimation unit 5 receives a receiving time RT from the RF receiving unit 2. The sending interval estimation unit 5, for example, estimates a time at which a signal is next sent from the beacon sending device. In accordance with the estimated time, the sending interval estimation unit 5 outputs a time control signal CSt for causing the RF receiving unit 2 to operate, to the RF receiving unit 2. The RF control unit 3 generates an operation control signal CSp based on the time control signal CSt from the sending interval estimation unit 5. Thus, the RF control unit 3 controls ON or OFF of the RF receiving unit 2.

That is, the RF control unit 3, for example, upon receiving an instruction for starting reception from the CPU 7 on which a program runs, turns ON the RF receiving unit 2 by the operation control signal CSp. Then, the RF control unit 3, upon receiving a first time signal, acquires a time from the clock count unit 4 and passes the time to the sending interval estimation unit 5. The sending interval estimation unit 5 holds the received time in the receiving time holding unit (memory) 6.

The RF control unit 3 leaves the RF receiving unit 2 to be ON until a second time signal is received. Then, the RF control unit 3, upon receiving a second time signal, acquires a time from the clock count unit 4 and passes the time to the sending interval estimation unit 5. The sending interval estimation unit 5 holds the value in the receiving time holding unit 6.

Additionally, the RF control unit 3 makes an inquiry (RT) about the next receiving time to the sending interval estimation unit 5. The sending interval estimation unit 5 determines a receiving interval from a difference between receiving times held by the receiving time holding unit 6.

The sending interval estimation unit 5 then assumes that the beacon sending device sends signals at intervals equal to the receiving intervals, and estimates that the next signal will be sent after the receiving interval has passed since the last signal was received. Then, the sending interval estimation unit 5 returns the time at which the next signal is estimated to be sent, as the next receiving time (CSt), to the RF control unit 3.

The RF control unit 3, upon receiving a signal of the next receiving time (CSt), turns OFF the RF receiving unit 2 by the operation control signal CSp. When the next receiving time is reached, the RF control unit 3 turns ON the RF control unit 2 to receive a signal. Thereafter, the same operation as when the second time signal is received is repeated.

Here, if, during the repetition, at the next receiving time (CSt) obtained from the sending interval estimation unit 5, a signal is not able to be received within a certain period of time even when the RF receiving unit 2 is turned ON, the RF control unit 3 starts again processing of receiving the first time signal while leaving the RF receiving unit 2 to be ON. The RF control unit 3, when receiving an instruction for completing reception from the CPU 7, turns OFF the RF receiving unit 2 to complete the operation.

For example, in the case where a plurality of beacon sending devices use the same channel and send signals at the same interval, once sending timings coincide with one another, sending timings continuously coincide with one another all the time. Therefore, the possibility that it becomes difficult to receive signals arises. To inhibit this, a technique by which sending intervals are shifted at random is applied to a beacon sending device in some cases.

Figure 3:
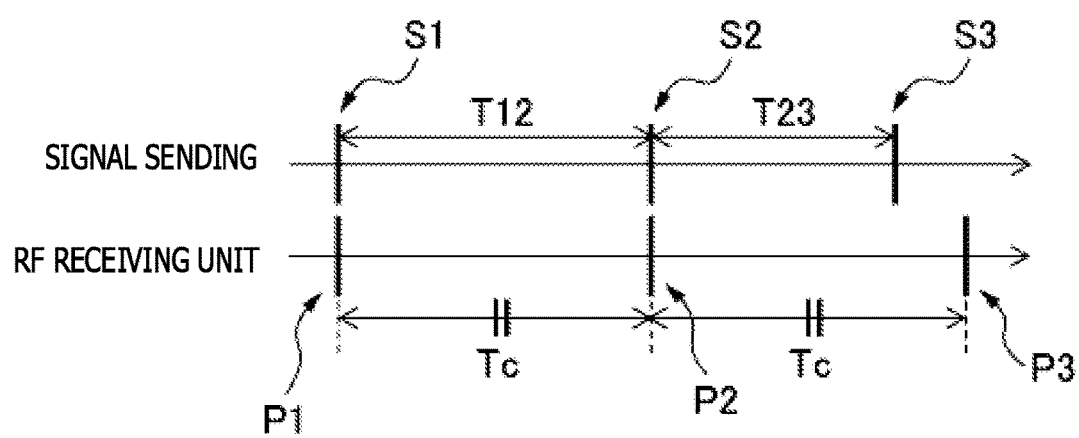
FIG. 3 is a diagram for explaining a case where sending intervals are not fixed.

FIG. 3 is a diagram for explaining a case where sending intervals are not fixed. The example illustrated in FIG. 3 indicates a case where an interval T12 (Tc) from a receiving timing P1 of the first time signal S1 to a receiving timing P2 of the second time signal S2 is longer than an interval T23 from the receiving timing P2 of the second time signal S2 to a receiving timing of the third time signal S3 (T12>T23).

As illustrated in FIG. 3, for example, when T12>T23, if, based on the interval T12 (Tc), the third signal S3 is attempted to be received, a timing P3 is later than a time at which the third signal S3 has sent. For this reason, there is a possibility that the signal S3 fails to be received.

Figure 4:
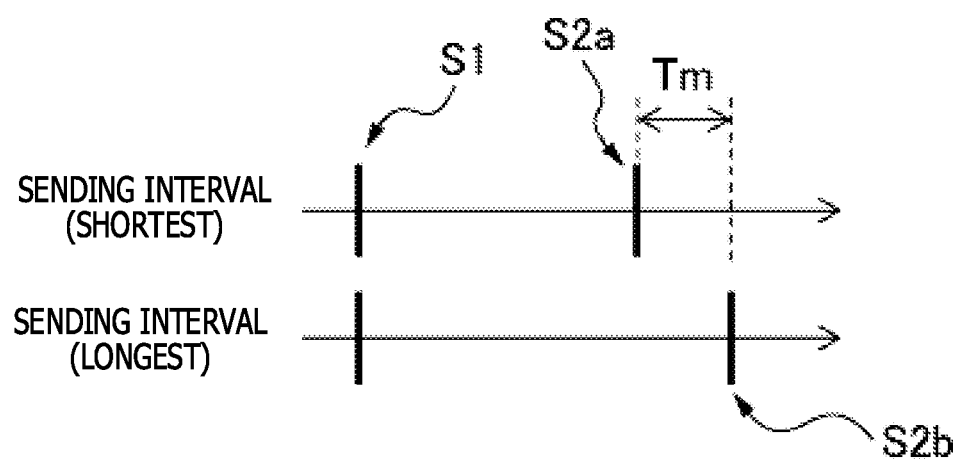
FIG. 4 is a diagram for explaining a difference between sending intervals.

FIG. 4 is a diagram for explaining a difference between sending intervals. FIG. 4 is a diagram for explaining a case where a maximum value Tm of a period of time by which intervals between signals sent from the beacon sending device described above (sending intervals) are shifted from each other is predetermined.

As illustrated in FIG. 4, the maximum value Tm of the period of time by which the sending intervals are shifted from each other is a time interval obtained by subtracting a sending interval (shortest) between the first time signal S1 and a second time signal S2a, which is the shortest sending interval, from a sending interval (longest) between the first signal S1 and a second signal S2b, which is the longest sending interval.

At this point, in the receiving device in the first embodiment, from the receiving interval and the maximum value Tm of the period of time by which the sending intervals are shifted from each other, the timing at which the next signal may be sent earliest is obtained and, at that timing, the RF receiving unit 2 is turned ON. This enables every one of the signals sent to be received.

Specifically, FIG. 4 illustrates the case where, with respect to the receiving interval, the sending interval of the next signal is shortest. In the case illustrated in FIG. 4, with respect to the receiving interval at which a signal sent at the sending interval (longest) is received, the next signal is sent at the sending interval (shortest). The next sending interval in this case is shorter than the receiving interval by the maximum value Tm of the period of time by which the sending intervals are shifted from each other.

Consequently, the time at which the next signal may be sent earliest is a time obtained by subtracting the maximum value Tm of the period of time, by which sending intervals are shifted from each other, from a time obtained by adding the receiving interval to a time at which a signal was received last time. At that time, the RF control unit 3 turns ON the RF control unit 2.

Here, for example, with the maximum value Tm of the period of time by which sending intervals are shifted from each other being predetermined, if the RF control unit 3 makes an inquiry about the next receiving time to the sending interval estimation unit 5, the sending interval estimation unit 5 determines a receiving interval from a difference between receiving times held in the receiving time holding unit 6. The sending interval estimation unit 5 is designed to return, to the RF control unit 3, as the next receiving time (CSt), a time obtained by subtracting the maximum value Tm of the period of time, by which sending intervals are shifted from each other, from a time obtained by adding the receiving interval to a time at which a signal was received.

FIG. 5A, FIG. 5B, FIG. 5C, FIG. 5D, and FIG. 5E are diagrams for explaining advantages achieved when sending intervals are fixed. Here, FIG. 5A and FIG. 5B are diagrams for explaining a case where a received signal contains information on sending intervals. FIG. 5C and FIG. 5E are diagrams for explaining a case where a received signal does not contain information on sending intervals.

First, with reference to FIG. 5A and FIG. 5B, the case where a received signal contains information on sending intervals will be described. As illustrated in FIG. 5B, the RF receiving unit 2, for example, is left to be ON until receiving the first signal S1 and therefore consumes power Pon1. However, the RF receiving unit 2 utilizes information on sending intervals contained in the signal S1 for second and greater signals S2, S3, . . . and consequently does not consume wasteful power.

For this reason, the RF receiving unit 2 only has to be turned ON at a timing at which the beacon sending device sends a signal, and to receive the signals S2, S3, . . . , enabling the power consumption to be decreased. This is similar for a receiving device to which the present embodiment is not applied.

Next, with reference to FIG. 5C, FIG. 5D, and FIG. 5E, the case where a received signal dos not contain information on sending intervals will be described. In a receiving device to which the present embodiment is not applied, as illustrated in FIG. 5D, the RF receiving unit 2, being ON at any time, receives the signals S2, S3, . . . . This results in increased power consumption.

In contrast, in a receiving device to which the present first embodiment is applied, as illustrated in FIG. 5E, the RF receiving unit 2 is left to be ON until the first and second signals S1 and S2 are received. However, since the sending intervals are fixed, the obtained sending interval is applied as it is, and the signals S2, S3, . . . are received. This enables power consumption to be reduced significantly.

FIG. 6A, FIG. 6B, and FIG. 6C are diagrams for explaining advantages in the case where sending intervals are not fixed. FIG. 6A, FIG. 6B, and FIG. 6C are diagrams for explaining advantages in the case where the technique by which sending intervals are shifted at random is applied to the beacon sending device.

That is, as illustrated in FIG. 6A, the signals S1, S2, S3, . . . from the beacon sending device vary in sending interval in the range of the maximum value Tm of the period of time by which the sending intervals are shifted from each other.

At this point, as illustrated in FIG. 6B, for example, when the latest signal contains sending interval information, for a timing obtained from the sending interval information, the RF control unit 3 causes the RF receiving unit 2 to be ON by a period of time that may accommodate, a timing variation of the maximum value Tm of the period of time by which sending intervals are shifted from each other.

In contrast, with the receiving device to which the present first embodiment is applied, as illustrated in FIG. 6C, the RF control unit 3 leaves the RF receiving unit 2 to be ON until the first and second time signals S1 and S2 are received. Consequently, power is consumed during that period of time.

However, in the present first embodiment, as the number of times a signal is received increases, the maximum value Tm of the period of time by which sending intervals are shifted from each other becomes clearer. This enables the period of time over which the RF receiving unit 2 is ON to be reduced to the same extent as in the case where the latest signal contains sending interval information. As a result, it is possible to reduce the power consumption to the same extent as in the case where the latest signal contains sending interval information.

Thus, for example, even when a received signal does not contain information on sending intervals, it becomes possible to quickly detect the receiving device (the user) leaving from a location where information is provided, as well as to control the power consumption.

FIG. 7 is a flowchart for explaining operations of an RF control unit in the receiving device in the first embodiment. FIG. 8 is a diagram for explaining a time when receiving starts next time (hereinafter referred to as a next receiving start time) and a time when receiving stops next time (hereinafter referred to as a next receiving stop time) in the flowchart illustrated in FIG. 7.

As illustrated in FIG. 7, first, when signals are sent at regular intervals (fixed intervals) from the beacon sending device, in ST 11, the RF control unit 3 receives an instruction for starting information acquisition from an application (a program executed on the CPU 7). The process proceeds to ST 12, where the RF control unit 3 sets the receiving count to 0 (=0).

The process further proceeds to ST 13, where the RF control unit 3 initializes the sending interval estimation unit 5 (the receiving time holding unit 6) and proceeds to ST 14. In ST 14, the RF control unit 3 sets the receiving mode to "continuous reception" (="continuous reception"), proceeds to ST 15, and turns ON the RF receiving unit 2. Subsequently, the process proceeds to ST 16, where the RF control unit 3 determines whether or not there is an instruction for completing information acquisition from the application.

That is, the RF control unit 3, upon receiving from the CPU 7 an instruction (CSr) for starting to acquire information on a particular beacon (ST11), initializes the sending interval estimation unit 5 (ST13) and turns ON the FR receiving unit 2 (ST15).

If, in ST16, it is determined that there is no instruction for completing information acquisition from the application, the process proceeds to ST17, where the RF control unit 3 determines whether or not the receiving mode is "intermittent reception". If, in ST17, it is determined that the reception mode is "intermittent reception", the process proceeds to ST18, where the RF control unit 3 waits until a receiving stop time. The process further proceeds to ST19, where the RF control unit 3 determines whether or not signal reception has been completed.

If, in ST19, it is determined that signal reception has not been completed, the RF control unit 3 returns to ST12 and repeats the same processing. If it is determined that signal reception has been completed, the process proceeds to ST20.

If, in ST16, it is determined that there is an instruction for completing information acquisition from the application, the process proceeds to ST29, where the RF control unit 3 turns OFF the RF receiving unit 2. The process further proceeds to ST31, where the RF control unit 3 completes this information processing process. If, in ST17, it is determined that the receiving mode is not "intermittent reception", the process proceeds to ST30, where the RF control unit 3 determines whether or not signal reception has been completed.

If, in ST30, it is determined that signal reception has not been completed, the RF control unit 3 returns to ST16 and repeats the same processing. If it is determined that signal reception has been completed, the RF control unit 3 proceeds to ST20.

In ST20, the RF control unit 3 sends a packet PK to the CPU 7 and proceeds to ST21, where the RF control unit 3 records a receiving time in the receiving time holding unit 6 with the sending interval estimation unit 5. Here, in ST21, the argument to "record receiving time" (function name) passed to and stored by the sending interval estimation unit 5 is "receiving time" and its return value is void.

That is, when reception of a signal has been completed such that the received data is ready to be read, and that signal is a signal sent from a specified beacon sending device, the RF control unit 3 sends a received packet (PK) to the CPU 7 (ST20), passes the receiving time to the sending interval estimation unit 5 and causes the sending interval estimation unit 5 to store the receiving time (ST21).

The RF control unit 3 further proceeds to ST22, where the RF control unit 3 adds "1" to the receiving count. The RF control unit 3 then proceeds to ST23, where the control unit 3 determines whether or not the receiving count is two or more. If, in ST23, it is determined that the receiving count is not two or more, that is, the receiving count is one, the RF control unit 3 returns to ST16 and repeats the same processing.

If, in ST23, it is determined that the receiving count is two or more, that is, the receiving count reaches two, the process proceeds to ST24, where the RF control unit 3 acquires the next receiving time of the sending interval estimation unit 5.

Further, in ST25, the RF control unit 3 sets the receiving mode to "intermittent reception" (="intermittent reception"). The process proceeds to ST26, where the RF control unit 3 sets Ts acquired from the sending interval estimation unit 5 as the receiving start time (next receiving start time) and Te as the receiving stop time (next receiving stop time).

Here, in ST24, the argument to "acquire next receiving time" (function name) acquired from the sending interval estimation unit 5 is void and the return value is as depicted in FIG. 8. That is, Ts and Te are Long integer (long type); the value of Ts represents the receiving start time, and the value of Te represents the receiving stop time.

Then, in ST27, the RF control unit 3 turns OFF the RF receiving unit 2. Then, the process proceeds to ST28, where the RF control unit 3 waits until the set receiving start time Ts. When the receiving start time Ts is reached, the FR control unit 3 returns to ST15 and turns ON the RF receiving unit 2. Thereafter, the same processing is performed.

That is, until information is successfully received two times after an instruction for starting to acquire information is received from the CPU 7 (ST23: NO), the RF control unit 3 continues the reception while leaving the RF receiving unit 2 to be ON. If information is successfully received two times (ST23: YES), the RF control unit 3 acquires a receiving start time and a receiving stop time from the sending interval estimation unit 5 (ST24).

Further, the RF control unit 3, upon acquiring the receiving start time and the receiving stop time, turns OFF the RF receiving unit 2 (ST27). Once the acquired receiving start time is reached (ST28), the RF control unit 3 turns ON the RF receiving unit (ST15).

Then, the RF control unit 3 waits until the receiving stop time (ST18), and, if a signal is able to be received by that point (ST19: YES), sends a received packet to the CPU 7 (ST20). Then, the RF control unit 3 passes a time at which the signal was received to the sending interval estimation unit 5 and causes the sending interval estimation unit 5 to store the time (ST21). In contrast, if the signal is not able to be received (ST19: NO), the RF control unit 3 continues to receive a signal while leaving the RF receiving unit 2 to be ON until information is successfully received two times. After information is successfully received two times (ST23: YES), the RF control unit 3 performs the same processing.

The RF control unit 3 repeats this processing until an instruction for completion of information acquisition is received from the CPU 7. If the instruction for completion is received (ST16: YES), the RF control unit 3 turns OFF the RF receiving unit (ST29) and completes the processing (ST31).

Figure 9:
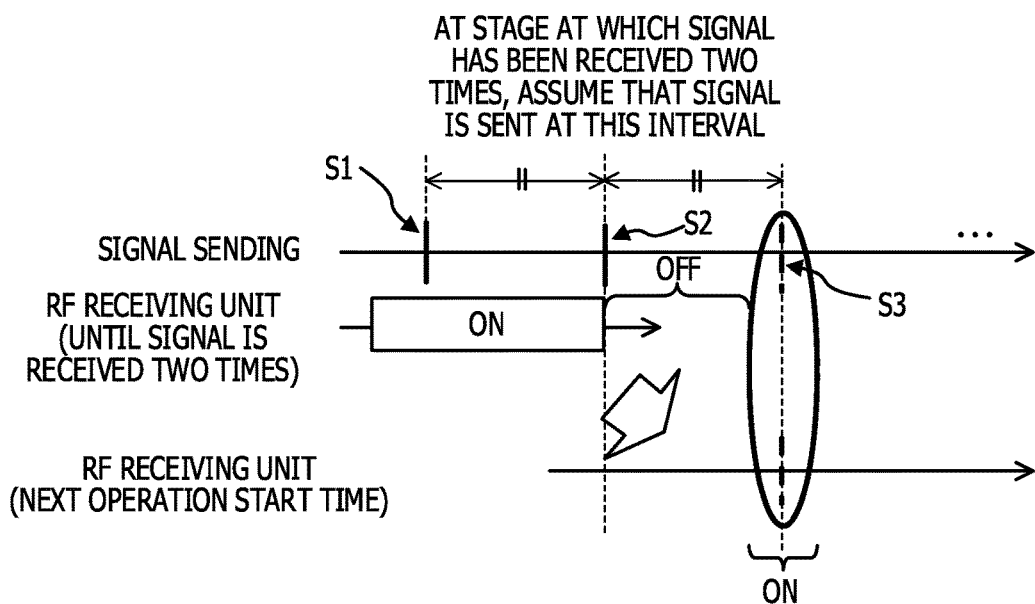
FIG. 9 is a diagram for explaining operations of the receiving device of the first embodiment.

FIG. 9 is a diagram for explaining operations of the receiving device in the first embodiment. As illustrated in FIG. 9, with the receiving device in the first embodiment, when signals are sent at regular intervals from the beacon sending device, the RF control unit 3 causes the receiving device to operate until a signal is received two times. Thereafter, the RF control unit 3 controls the RF receiving unit 2 so as to cause the RF receiving unit 2 to be ON or OFF, on the assumption that signals will be sent at the same intervals as those of the two received signals S1 and S2.

That is, if sending intervals (regular intervals) are able to be estimated through the signal reception performed two times, the RF control unit 3 determines, from the estimated sending intervals, a time at which the next signal S3 will be sent. The RF control unit 3 causes the RF receiving unit 2 to be OFF (stopped) until the signal S3 is sent. When the time at which the signal S3 is sent (the time at which the signal S3 is estimated to be sent) is reached, the RF control unit 3 turns ON (operates) the RF receiving unit 2 for a period of time over which a signal is received.

Figure 10A:
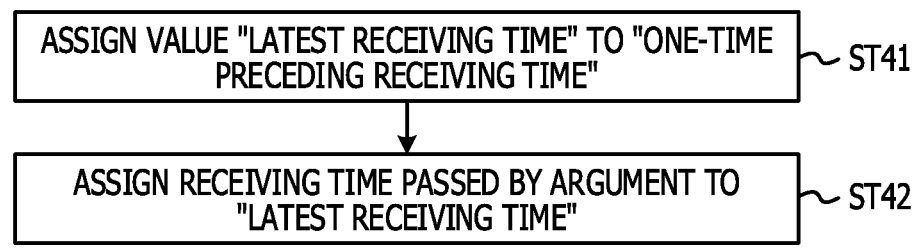
FIG. 10A and FIG. 10B are flowcharts for explaining operations of a sending interval estimation unit in the receiving device in the first embodiment.
Figure 10B:
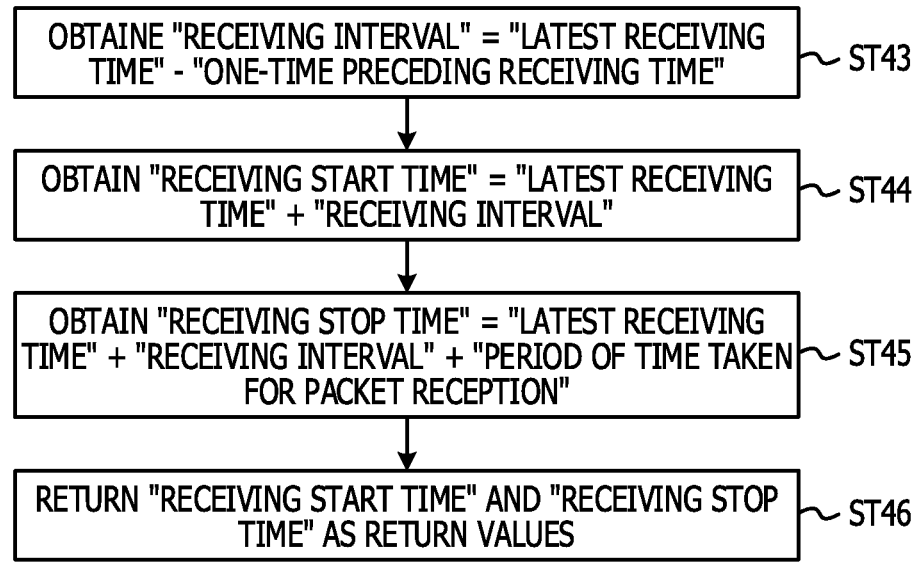

FIG. 10A and FIG. 10B are flowcharts for explaining operations of the sending interval estimation unit in the receiving device in the first embodiment. FIG. 11 is a diagram depicting an example of a constant and variables in the flowcharts illustrated in FIG. 10A and FIG. 10B.

FIG. 10A illustrates an example of a receiving time recording process (ST21 in FIG. 7) performed by the sending interval estimation unit 5. FIG. 10B illustrates an example of a next receiving time acquiring process (ST24 in FIG. 7) performed by the sending interval estimation unit 5.

As illustrated in FIG. 10A, in the receiving time recording process in the first embodiment, first, in ST41, the value of "latest receiving time" is assigned to "one-time preceding receiving time". Further, the process proceeds to ST42, where the receiving time passed by an argument is assigned to "latest receiving time". Thus, the sending interval estimation unit 5 may record the receiving time in the receiving time holding unit 6.

As illustrated in FIG. 10B, in the next receiving time acquiring process in the first embodiment, first, in ST43, the receiving interval is obtained as "receiving interval"="latest receiving time"−"one-time preceding receiving time", and the process proceeds to ST44. That is, the sending interval estimation unit 5 may obtain a receiving interval by reading and processing "latest receiving time" and "one-time preceding receiving time" recorded in the receiving time holding unit 6.

In ST44, the receiving start time is obtained as "receiving start time"="latest receiving time"+"receiving interval", and the process proceeds to ST45. In ST45, the receiving stop time is obtained as "receiving stop time"="latest receiving time"+"receiving interval"+"period of time taken for packet reception", and the process proceeds to ST46.

Then, in ST46, "receiving start time (next receiving start time)" and "receiving stop time (next receiving stop time)" are returned as return values to the RF control unit 3. In such a way, the RF control unit 3 may acquire "receiving start time" and "receiving stop time" from the sending interval estimation unit 5.

As illustrated in FIG. 11, the sending interval estimation unit 5 has "period of time taken for packet reception (Tp)" as a constant and "latest receiving time (T0)" and the "one-time preceding receiving time (T1)" as variables that are held. The sending interval estimation unit 5 further has "receiving interval (Ti)", "next receiving start time (Ts)" and "next receiving stop time (Te)" as temporary variables. Tp, T0, T1, Ti, Ts, and Te are Long (long integer type).

Here, Tp represents the maximum value of a period of time taken for packet reception. The sending interval estimation unit 5 holds in advance the time Tp, which is taken for packet reception, in the receiving time holding unit (memory) 6. T0 represents the latest receiving time, and T1 represents the receiving time that immediately precedes the latest receiving time (one-time preceding receiving time). The sending interval estimation unit 5 also holds the latest receiving time T0 and the one-time preceding receiving time T1 in the receiving time holding unit 6.

The sending interval estimation unit 5, once receiving a receiving time from the RF control unit 3 and instructed to record the receiving time by the RF control unit 3, assigns T0 to T1 (ST41). The sending interval estimation unit 5 then assigns the receiving time input from the RF control unit 3 to T0 and holds it (ST42).

Ti represents the interval between the latest two signals received. The sending interval estimation unit 5 computes Ti by Ti=T0−T1 (ST43). The next receiving start time Ts represents a time at which the RF control unit 3 turns ON the FR receiving unit 2 for receiving the next signal. The sending interval estimation unit 5 computes Ts by Ts=T0+Ti (ST44).

Te represents a time at which a failure in reception is determined if a signal has not been able to be received until that time. The sending interval estimation unit 5 computes Te by Te=T0+Ti+Tp (ST45). Then, the sending interval estimation unit 5, when instructed to acquire the next receiving time by the RF control unit 3, returns Ts and Te computed by the above processing to the RF control unit 3 (ST46).

As described with reference to FIG. 3 to FIG. 6C, when a plurality of beacon sending devices send signals at the same interval by using the same channel, the situation where sending timings continuously coincide with one another all the time could occur. To avoid the situation, the technique by which intervals at which signals are sent are shifted at random is applied in some cases.

Figure 12:
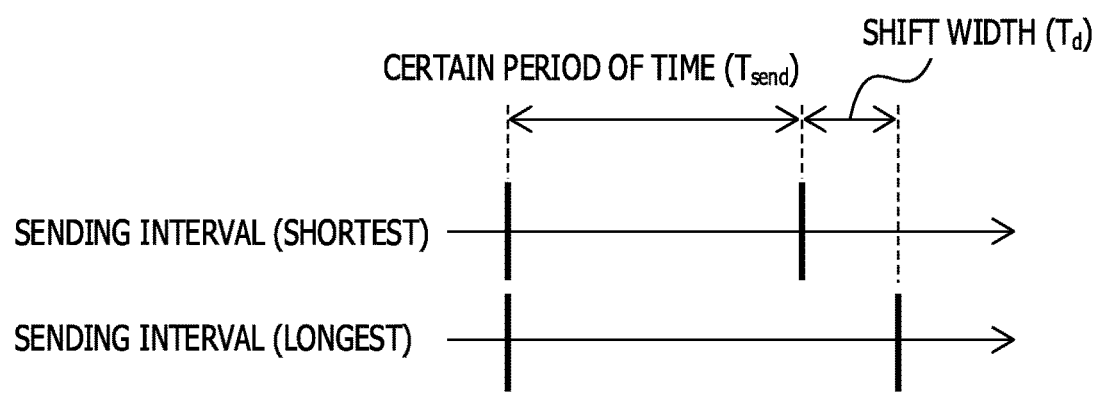
FIG. 12 is a diagram for explaining a way to shift a sending interval.
Figure 13:
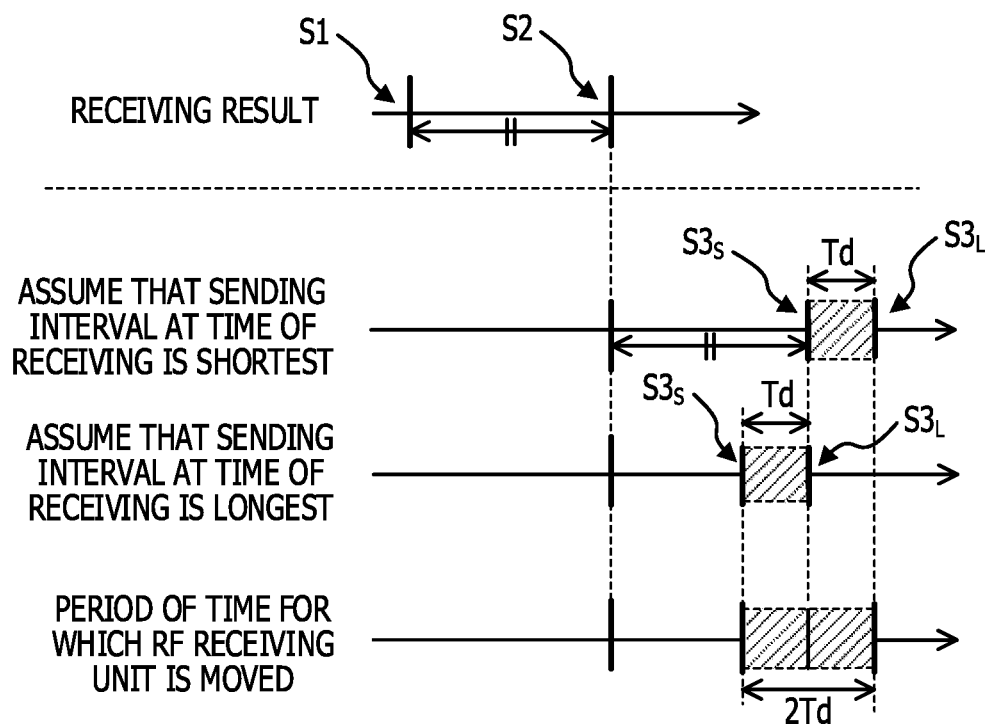
FIG. 13 is a diagram for explaining operations of an RF control unit in a receiving device in a second embodiment.

FIG. 12 is a diagram for explaining a way to shift a sending interval. FIG. 13 is a diagram for explaining operations of an RF control unit in a receiving device in a second embodiment. As illustrated in FIG. 12, the intervals (sending intervals) of signals sent by beacon sending devices are not regular intervals. For example, in some cases, the sending intervals are varied at random from a certain period of time (Tsend) within the range of a value (Tsend+Td) obtained by adding a certain shift width to the value of the certain period of time (Tsend).

As illustrated in FIG. 13, in the receiving device in the second embodiment, the sending interval estimation unit 5 has in advance, in addition to the constant and the variables in the first embodiment, for example, a shift width (Td) of the sending interval prescribed in standards as a constant.

That is, FIG. 13 illustrates an example of the case where the signals S1, S2, S3, . . . sent from the beacon sending device are sent in such a manner as to be shifted within a predetermined maximum value (Td) from a certain interval.

As described above, for example, a sending interval is obtained from two-time reception of the signals S1 and S2. Assuming that the obtained sending interval is shortest, the shift in sending interval to a signal $3_L$ when the next sending interval is longest (the shift width is largest) is Td.

For example, assuming that the sending interval obtained from two-time reception of the signals S1 and S2 is longest, the shift in sending interval to a signal $S3_S$ when the next sending interval is shortest (the shift width is longest) is also Td.

Consequently, when the RF receiving unit 2 is caused to be ON by two times (2Td) the shift width Td of the sending interval, it is possible to receive the next signal S3 ($S3_L$, $S3_S$). That is, the sending interval estimation unit 5, when instructed to acquire the next receiving time by the RF control unit 3, computes the receiving start time Ts as Ts=T0+Ti−Td. The sending interval estimation unit 5 computes the receiving completion time Te as Te=T0+Ti+Td+Tp and may return it to the RF control unit 3.

Figure 14A:
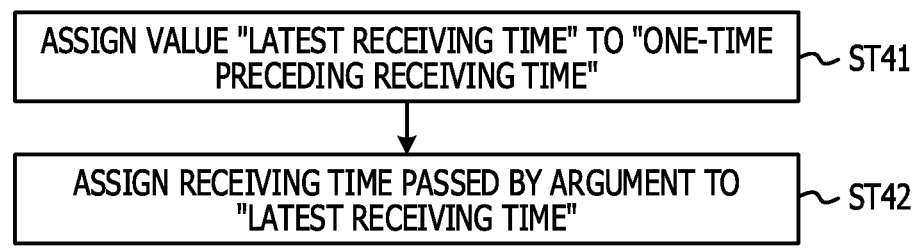
FIG. 14A, FIG. 14B, and FIG. 14C are flowcharts illustrating an example of operations of a sending interval estimation unit in a receiving device in a third embodiment.
Figure 14B:
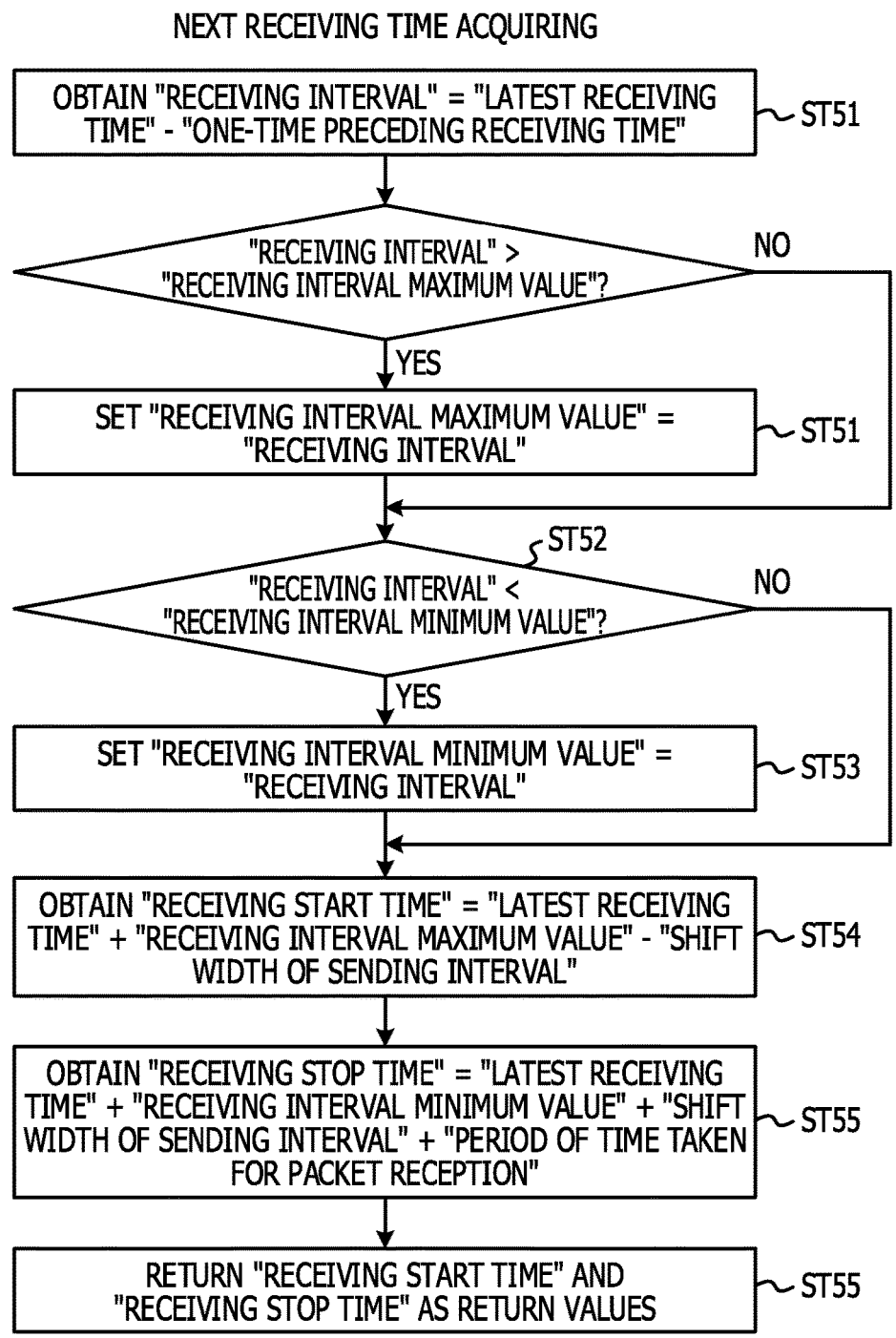
Figure 14C:
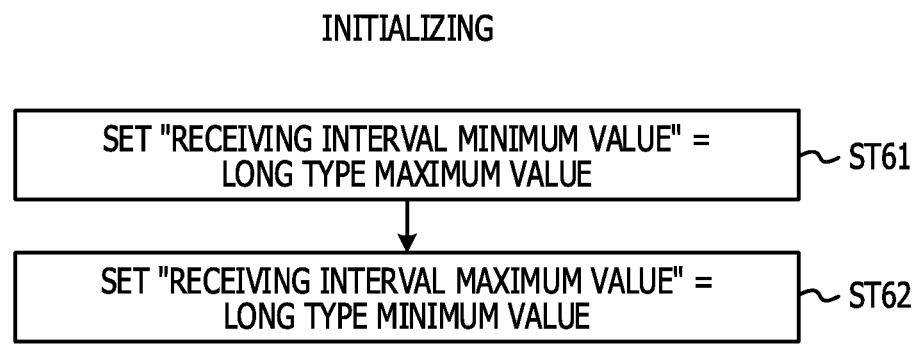

FIG. 14A, FIG. 14B, and FIG. 14C are flowcharts illustrating an example of operations of a sending interval estimation unit in a receiving device in a third embodiment. FIG. 15 is a diagram depicting an example of a constant and variables in the flowchart illustrated in FIG. 14A, FIG. 14B, and FIG. 14C.

Here, FIG. 14A illustrates an example of the receiving time recording process performed by the sending interval estimation unit 5. FIG. 14B illustrates an example of the next receiving time acquiring process performed by the sending interval estimation unit 5, and FIG. 14C illustrates an example of an initialization process performed by the sending interval estimation unit 5.

The receiving time recording process illustrated in FIG. 14A corresponds to the processing in ST21 in FIG. 7 described above. The next receiving time acquiring process illustrated in FIG. 14B corresponds to the processing in ST24 in FIG. 7 described above. The initialization process of "receiving interval minimum value" and "receiving interval maximum value" illustrated in FIG. 14C is a process characteristic of the present third embodiment.

As apparent from a comparison between FIG. 14A and FIG. 10A referred to in the above description, the receiving time recording process in the receiving device in the present third embodiment is similar to the receiving time recording process in the receiving device in the first embodiment described above.

That is, as illustrated in FIG. 14A, in the receiving time recording process in the third embodiment, in ST41, the sending interval estimation unit 5 assigns the value of "latest receiving time" to "one-time preceding receiving time". Then, the process proceeds to ST42, where the sending interval estimation unit 5 assigns a receiving time passed by the argument to "latest receiving time". Thus, the sending interval estimation unit 5 may record the receiving time in the receiving time holding unit 6.

In contrast, as apparent from a comparison between FIG. 14B and FIG. 10B referred to in the above description, the next receiving time acquiring process in the receiving device in the present third embodiment differs from the next receiving time acquiring process in the receiving device in the first embodiment described above.

That is, as illustrated in FIG. 14B, in the next receiving time acquiring process in the third embodiment, first, in ST51, the sending interval estimation unit 5 obtains the receiving interval as "receiving interval"="latest receiving time"–"one-time preceding receiving time" and proceeds to ST52.

That is, the sending interval estimation unit 5 may obtain a receiving interval by reading and processing "latest receiving time" and "one-time preceding receiving time" recorded in the receiving time holding unit 6. This is similar to the processing in ST43 in FIG. 10B described above.

In ST52, the sending interval estimation unit 5 determines whether or not "receiving interval" is larger than "receiving interval maximum value". If it is determined that "receiving interval" is larger than "receiving interval maximum value", the process proceeds to ST53. In ST53, the sending interval estimation unit 5 sets "receiving interval maximum value"="receiving interval" and proceeds to ST54, where the sending interval estimation unit 5 determines whether or not "receiving interval" is smaller than "receiving interval minimum value". If, in ST52, it is determined that "receiving interval" is not larger than "receiving interval maximum value", the process proceeds to ST54.

If, in ST54, it is determined that "receiving interval" is smaller than "receiving interval maximum value", the process proceeds to ST55, where the sending interval estimation unit 5 sets "receiving interval minimum value"="receiving interval" and proceeds to ST56. On the other hand, if, in ST54, it is determined that "receiving interval" is not smaller than "receiving interval minimum value", the process directly proceeds to ST56.

In ST56, the sending interval estimation unit 5 obtains "receiving start time"="latest receiving time"+"receiving interval maximum value"–"shift width of sending interval" and further proceeds to ST57. In ST57, the sending interval estimation unit 5 obtains "receiving stop time"="latest receiving time"+"receiving interval minimum value"+"shift width of sending interval"+"period of time taken for packet reception" and proceeds to ST58.

Then, in ST58, the sending interval estimation unit 5 returns "receiving start time (next receiving start time)" and "receiving stop time (next receiving stop time)" as return values to the RF control unit 3. In this way, the RF control unit 3 may acquire "receiving start time" and "receiving stop time" from the sending interval estimation unit 5.

As illustrated in FIG. 14C, in the initialization process in the third embodiment, in ST61, "receiving interval minimum value"=Long type maximum value is set, and the process further proceeds to ST62, where "receiving interval maximum value"=Long type minimum value is set.

Here, in the receiving device in the second embodiment described with reference to FIG. 13, the period of time from the receiving start time to the receiving completion time, Te–Ts, is 2Td+Tp. The longer this period of time 2Td+Tp, the longer is the period of time over which the RF receiving unit 2 operates and the larger is the power consumption.

Therefore, in the present third embodiment, in order to decrease the period of time over which the RF receiving unit 2 operates, the longest one (receiving interval maximum value Tmax) of the receiving intervals in the past and the shortest one (receiving interval minimum value Tmin) are stored in the receiving time holding unit 6 by the sending interval estimation unit 5. Then, as in the second embodiment, the receiving start time for the longest one of the receiving intervals in the past and the receiving completion time for the shortest one of the receiving intervals in the past are obtained and are returned to the RF control unit 3.

That is, in the receiving device in the third embodiment, the sending interval estimation unit 5 has, in addition to the constant and variables in the first (second) embodiment described with reference to FIG. 11, the receiving interval maximum value Tmax and the receiving interval minimum value Tmin as variables held. Here, Tmax represents a maximum value of receiving intervals in the past. Tmin represents a minimum value of receiving intervals in the past.

The sending interval estimation unit 5, upon receiving an instruction for initialization from the RF control unit 3, initializes the receiving interval maximum value Tmax (ST61) and initializes the receiving interval minimum value Tmin (ST62). Then, the sending interval estimation unit 5, upon receiving a receiving time from the RF control unit 3 and instructed to record a receiving time by the RF control unit 3, assigns T0 to T1 (ST41) and assigns the receiving time input from the RF control unit 3 to T0 and holds them (ST42).

The sending interval estimation unit 5, once instructed to acquire a next receiving time from the RF control unit 3, computes Ti as Ti=T0–T1 (ST51). If Tmax is exceeded (Ti>Tmax: ST52), the sending interval estimation unit 5 assigns Ti to the value of Tmax (Tmax=Ti: ST53). If Tmin is exceeded (Ti<Tmin: ST54), the sending interval estimation unit 5 assigns Ti to the value of Tmin (Tmin=Ti: ST55).

Then, the sending interval estimation unit 5 obtains Ts as Ts=T0+Tmax−Td (ST56), obtains Te as Te=T0+Tmin+Td+Tp (ST57), and returns Ts and Te to the RF control unit 3 (ST58). Thus, the difference between Tmax and Tmin is Td at the maximum, and the period of time from the receiving start time Ts to the receiving completion time Te in that case is Td+Tp. Therefore, the power consumption may be reduced more than in the second embodiment.

Figure 16:
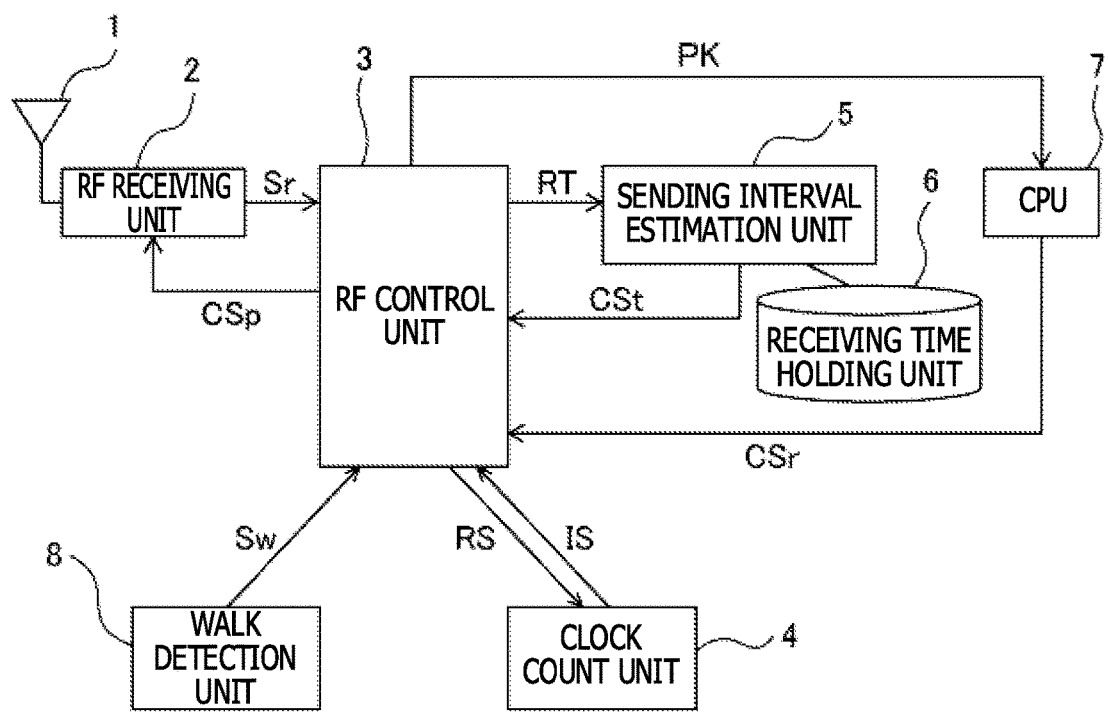
FIG. 16 is a block diagram illustrating a fourth embodiment of the receiving device.

FIG. 16 is a block diagram illustrating a fourth embodiment of the receiving device. As apparent from a comparison between FIG. 16 and FIG. 2 referred to in the above description, in the receiving device in the present fourth embodiment, a walk detection unit (movement detection unit) 8 is added.

In the first to third embodiments described above, if a signal from a beacon sending device that is to be received is not received, the RF receiving unit 2 is in the ON state all the time. Consequently, while the receiving device is at a location where a signal from the beacon sending device that is to be received is difficult to receive, the advantage of reducing power consumption is not demonstrated.

Therefore, in the present fourth embodiment, in order to reduce the power consumption of the receiving device while the receiving device is at a location where a signal from a beacon receiving device that is to be received is difficult to receive, information obtained from a sensor of the receiving device or received information is used in combination.

For example, when the receiving device is provided with the walk detection unit 8 with an acceleration sensor, receiving operation is performed only while the user is walking (while the receiving device is moving) by using the walk detection unit 8. Thereby, the power consumption while the user is not walking may be controlled.

In the receiving device in the fourth embodiment illustrated in FIG. 16, the antenna 1, the RF receiving unit 2, the RF control unit 3, the clock count unit 4, the sending interval estimation unit 5, the receiving time holding unit 6, and the CPU 7 are substantially the same as described with reference to FIG. 2.

The walk detection unit 8 is not limited to one using an acceleration sensor. Furthermore, receiving operations are performed only while the user is not walking (the receiving device is not moving: for example, while the user stops), and thereby the power consumed by the receiving device while the user is walking may be controlled.

Figure 17A:
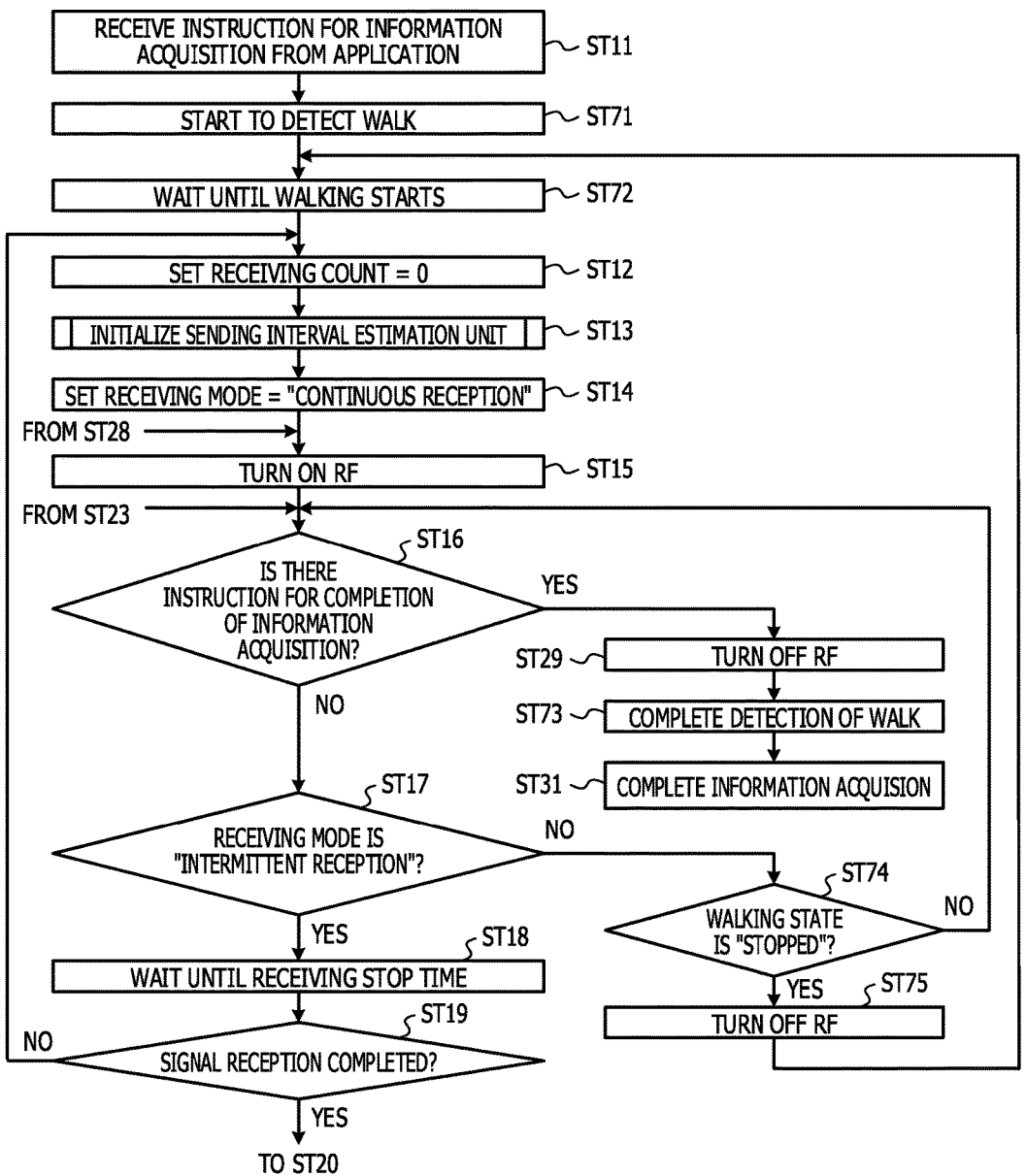
FIG. 17A and FIG. 17B are flowcharts (1) illustrating an example of operations of an RF control unit in the receiving device in the fourth embodiment.
Figure 17B:
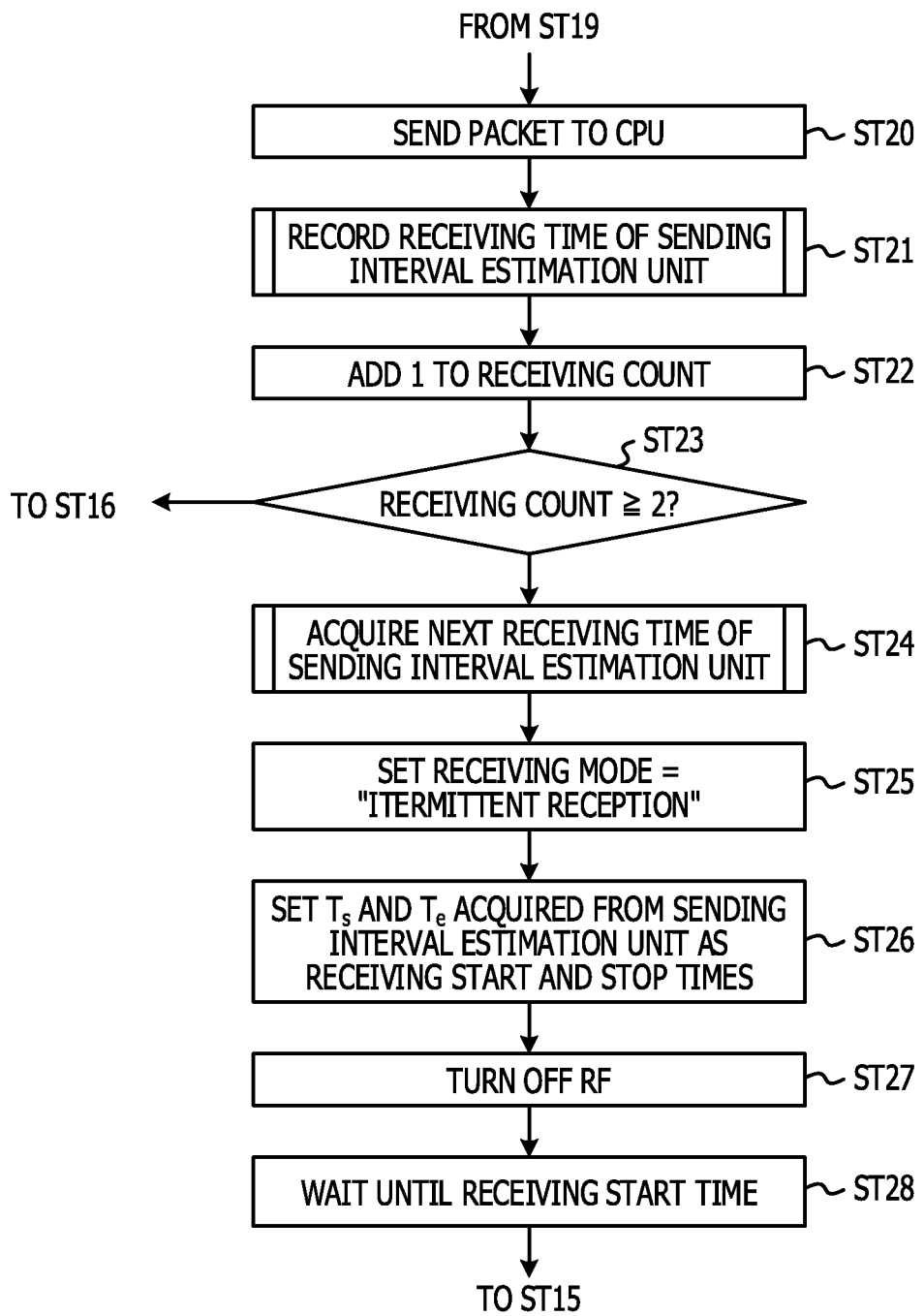
Figure 18:
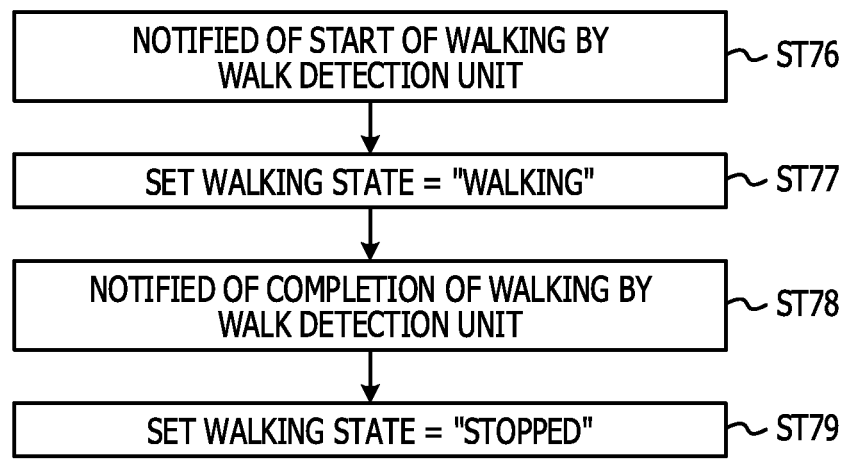
FIG. 18 is a flowchart (2) illustrating the example of operations of the RF control unit in the receiving device in the fourth embodiment.

FIG. 17A, FIG. 17B and FIG. 18 are flowcharts for explaining operations of the RF control unit in the receiving device in the fourth embodiment. As apparent from a comparison between FIG. 17A and FIG. 7 referred to in the above description, in the present fourth embodiment, the processing in ST30 in FIG. 7 is deleted and new processing in ST71 to ST75 is added.

As illustrated in FIG. 17A, first, when signals are sent at regular intervals (fixed intervals) from a beacon sending device, in ST11, the RF control unit 3 receives an instruction for starting information acquisition from an application (a program executed on the CPU 7), and the process proceeds to ST71, where the RF control unit 3 starts to detect a walk.

The process further proceeds to ST72, where the RF control unit 3 waits until the user starts walking, and the process proceeds to ST12, where the RF control unit 3 sets the receiving count to zero (=0). Processing in ST12 to ST29 is the same as in the first embodiment described with reference to FIG. 7 and description of the processing is omitted.

That is, if, in ST16, it is determined that an instruction for completing information acquisition is not issued from the application, the process proceeds to ST17, where the RF control unit 3 determines whether or not the receiving mode is "intermittent reception". If, in ST17, it is determined that the receiving mode is not "intermittent reception", the process proceeds to ST74, where the RF control unit 3 determines whether or not the walking state is "stopped".

If, in ST74, it is determined that the walking state is "stopped", the process proceeds to ST75, where the RF control unit 3 turns OFF the RF receiving unit 2. The process then returns to ST72, where the RF control unit 3 waits until walking starts, and repeats the same processing. That is, when the walking state is "stopped", no signal from the beacon sending device is received. This enables the power consumption to be reduced by turning OFF the RF receiving unit 2.

On the other hand, if, in ST74, it is determined that the walking state is not "stopped", that is, the user is walking, the process proceeds to ST16, where the RF control unit 3 determines whether or not an instruction for completing information acquisition is issued from the application.

If, in ST16, it is determined that no instruction for completing information acquisition is issued from the application, and, in ST17, it is determined that the receiving mode is "intermittent reception", the process proceeds to ST18, where the RF control unit 3 performs the same processing as described with reference to FIG. 7.

If, in ST16, it is determined that an instruction for completing information acquisition is issued from the application, the process proceeds to ST29, where the RF control unit 3 turns OFF the RF receiving unit 2. The process further proceeds to ST73, where the RF control unit 3 completes walk detection. The process then proceeds to ST31, where the RF control unit 3 completes information acquisition.

As illustrated in FIG. 18, in ST76, once notification of start of walking is given from the walk detection unit 8, the process proceeds to ST77, where the walking state is set to "walking" (="walking"). In ST78, once notification of completion of walking is given from the walk detection unit 8, the process proceeds to ST79, where the walking state is set to "stopped" (="stopped"). Thus, it is possible to determine in ST74 in FIG. 17 whether or not the walking state is "stopped".

That is, in the present fourth embodiment, the RF control unit 3, once instructed to start information acquisition by the CPU 7, instructs the walk detection unit 8 to issue notification at the time when walking starts and at the time when walking stops. The RF control unit 3, when notified of start or completion of walking by the walk detection unit 8, updates the walking state.

Then, the RF control unit 3 waits until notification of start of walking is given (ST72), initializes the sending interval estimation unit 5 (ST13), and turns ON the RF receiving unit 2 (ST15). The RF control unit 3 further, whenever receiving information, sends a received packet to the CPU 7 (ST20) and records the receiving time (ST21).

The RF control unit 3 continues receiving, while leaving the RF receiving unit 2 to be ON, from the time when the RF control unit 3 receives an instruction for starting information acquisition from the CPU 7 until the RF control unit 3 successfully receives information two times (ST23: NO). Additionally, if information is successfully received two times (ST23: YES), the RF control unit 3 acquires a receiving start time and a receiving stop time from the sending interval estimation unit 5 (ST24).

The RF control unit 3, upon acquiring the receiving start time and the receiving stop time, turns OFF the RF receiving unit 2 (ST27). When the acquired receiving start time is reached (ST28), the RF control unit 3 turns ON the RF receiving unit 2 (ST15).

The RF control unit 3 waits until the receiving stop time (ST18). If a signal is able to be received until that time (ST19: YES), the RF control unit 3 sends a received packet to the CPU 7 (ST20) as illustrated in FIG. 17B, and passes the receiving time to the sending interval estimation unit 5 and causes the ending interval estimation unit 5 to store the receiving time (ST21). On the other hand, if a signal is not able to be received (ST19: NO), the RF control unit 3 continues receiving while leaving the RF receiving unit 2 to be ON until information is successfully received two times. The RF control unit 3 performs the same processing after information is successfully received two times (ST23: YES).

It is to be understood that the first to third embodiments described above, without any change, are applicable to the processing of the sending interval estimation unit 5 in the present fourth embodiment.

FIG. 19 is a diagram depicting an example of constants and a variable in the flowcharts illustrated in FIG. 17A, FIG. 17B and FIG. 18. As illustrated in FIG. 19, in the present fourth embodiment, "walking state" is given as a variable held. As temporary variables, "receiving start time", "receiving stop time", "receiving mode", and "receiving count" are given. "Walking state", "receiving mode", and "receiving count" are String (string type). "Receiving start time" and "receiving stop time" are Long (long integer type).

In such a manner, according to the present fourth embodiment, for example, the receiving operation is performed only while the user is walking, by using the walk detection unit 8 provided in the receiving device. This enables the power consumed while the user is not walking to be controlled. Furthermore, the receiving operation is performed only while the user stops walking, and thus the power consumed while the user is walking may also be controlled.

Figure 20:
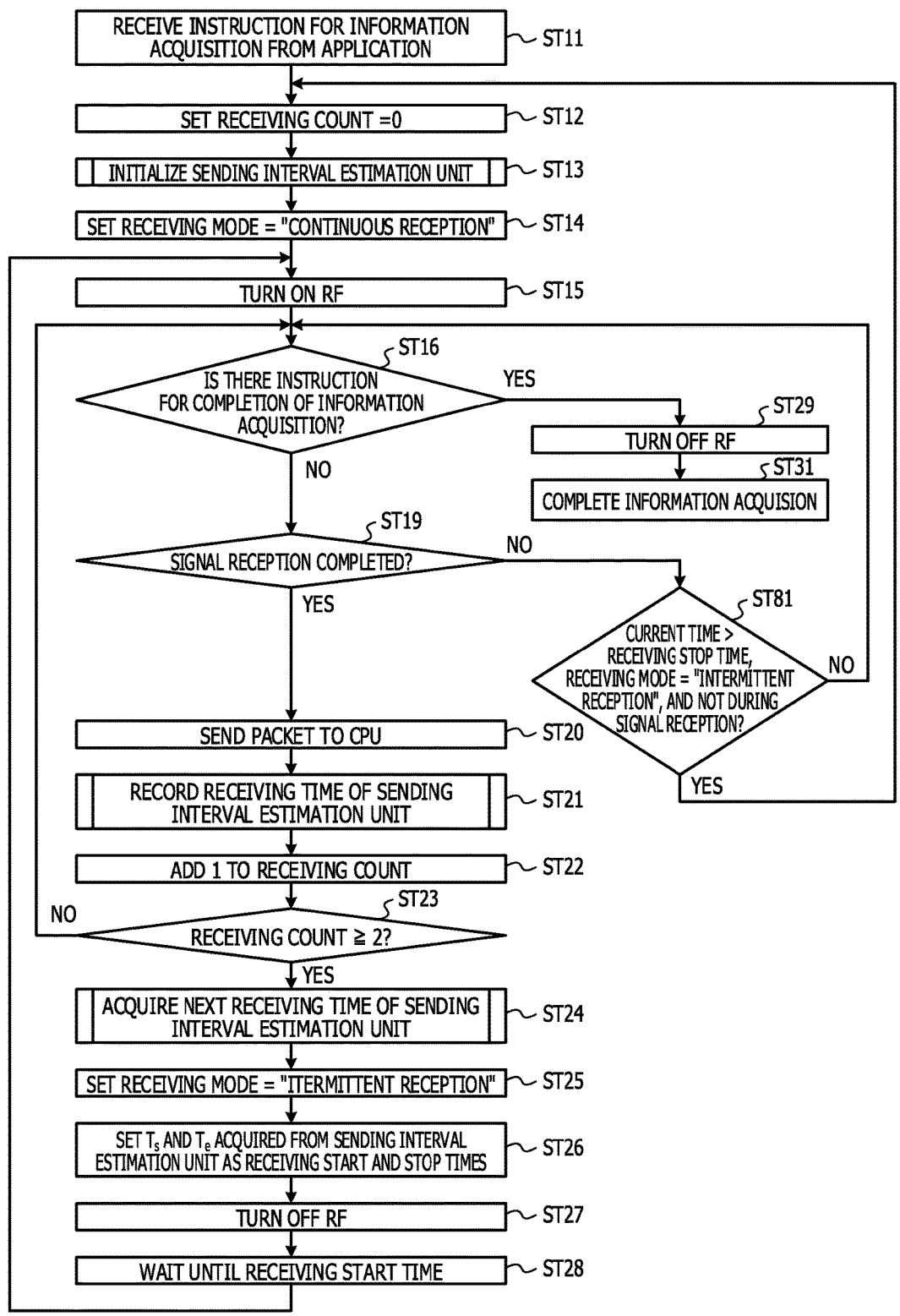
FIG. 20 is a flowchart illustrating an example of operations of an RF control unit in a receiving device in a fifth embodiment.

FIG. 20 is a flowchart illustrating an example of operations of an RF control unit in a receiving device in a fifth embodiment.

As apparent from a comparison between FIG. 20 and FIG. 7 referred to in the above description, in the present fifth embodiment, the processing in ST17, ST18, and ST30 is deleted and new processing in ST81 is added. The hardware configuration of the receiving device in the fifth embodiment is substantially the same as in the receiving device in the first embodiment described with reference to FIG. 2.

The receiving device in the present fifth embodiment receives signals sent from the beacon sending device. For example, when having completed signal reception before an estimated receiving stop time, the RF control unit 3 stops reception at that stage. When the receiving device is during signal reception at the estimated receiving stop time, the RF control unit 3 continues the receiving operation until the reception is completed.

That is, as illustrated in FIG. 20, if, in ST16, it is determined that no instruction for information acquisition is given from the application, the process proceeds to ST19, where the RF control unit 3 determines whether or not signal reception is complete. If, in ST19, it is determined that signal reception is not complete, the process proceeds to ST81, where the RF control unit 3 determines whether or not the current time>the receiving stop time, the receiving mode="intermittent reception", and the receiving device is not during signal reception.

If, in ST81, it is determined that the conditions of the current time>the receiving stop time, the receiving mode="intermittent reception", and the receiving device being not during signal reception are met, the process returns to ST12, where the RF control unit 3 sets the receiving count to zero (=0) and performs the same processing as that with reference to FIG. 7.

On the other hand, if, in ST81, it is determined that the conditions of the current time>the receiving stop time, the receiving mode="intermittent reception", and the receiving device being not during signal reception are not met, the process returns to ST16, where the RF control unit 3 continues the same processing until these conditions are met. The processing in other steps are, for example, the same as in the first embodiment described above, and description of the processing is omitted.

The receiving start time (next receiving start time) Ts and the receiving stop time (next receiving stop time) Te acquired from the sending interval estimation unit 5 in ST24 are Long (long integer type) as described above with reference to FIG. 8.

In such a manner, according to the receiving device in the present fifth embodiment, when reception of a signal sent from the beacon sending device, in the first to fourth embodiments described above, for example, is completed before the receiving stop time, the reception may be stopped at that stage. This makes it possible to reduce the period of time over which the RF receiving unit 2 is operated, reducing more the power consumption.

Although the embodiments have been described above, all the examples and conditions described herein are described for the purpose of helping understanding of the present disclosure and the concept of the present disclosure applied to techniques, and the described examples and conditions are not intended to limit the scope of the present disclosure. Such descriptions in the specification do not represent advantages and drawbacks of the present disclosure. Although the embodiments of the present disclosure have been described in detail, it is to be understood that various changes, replacements, and modifications may be made without departing from the spirit and scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of controlling a communication device executed by a processor included in the communication device, the communication device having a receiver, the method comprising:
   of a plurality of radio signals received through the receiver from a device that transmits the plurality of radio signals while shifting timing at random by a value with respect to a receiving interval, for each of the plurality of radio signals after two radio signals are received, calculating the receiving interval and the value based on the respective radio signal and at least two radio signals among the plurality of radio signals that are previously received from the device;
   estimating a time period in which another radio signal, of the plurality of radio signals, is subsequently received from the device based on the calculated receiving interval and the calculated value; and
   activating the receiver during the estimated time period.

2. The method according to claim 1, further comprising causing the receiver to be set to be in a stopped state in a period of time before the estimated time period.

3. The method according to claim 2, wherein the activating the receiver sets the receiver to be in an operating state, and wherein setting the receiver to be in the stopped state includes
   switching the receiver from the operating state to the stopped state when a radio signal, of the plurality of radio signals, transmitted from the device is received by the receiver.

4. The method according to claim 2, wherein the activating the receiver sets the receiver to be in an operating state, and wherein setting the receiver to be in the operating state includes
   setting the receiver to be in the operating state at a timing at which each of the plurality of radio signals is transmitted from the communication device, the timing being computed based on the estimated time period.

5. The method according to claim 1, wherein the estimating the time period includes:
   obtaining the receiving interval by calculating a difference between a first time at which a first radio signal, of the plurality of radio signals, has been received this time and a second time at which a second radio signal, of the plurality of radio signals, has been received last time,
   obtaining a central timing of the estimated time period by adding the receiving interval to the first time,
   obtaining an earliest timing of the estimated time period by subtracting the calculated value from the central timing,
   obtaining a latest timing of the estimated time period by adding the calculated value to the central timing, and
   setting a term between the earliest timing and the latest timing as the time period.

6. The method according to claim 1, wherein the activating the receiver sets the receiver to be in an operating state, the method further comprising estimating a second time period between the at least two radio signals, when a third radio signal, of the plurality of radio signals, has not been received within a given period of time since the receiver was set to be in the operating state.

7. The method according to claim 1, wherein the activating the receiver sets the receiver to be in an operating state, and further comprising:

determining whether the communication device has moved; and setting the receiver to be in the stopped state or in the operating state, when it is determined that the communication device has moved.

8. The method according to claim 7, wherein the determining includes determining whether the communication device has moved based on information transmitted from an acceleration sensor included in the communication device.

9. A communication device, comprising:

a receiver; and a processor coupled to the receiver and configured to:

of a plurality of radio signals received through the receiver from a device that transmits a plurality of radio signals while shifting timing at random by a value with respect to a receiving interval, for each of the plurality of radio signals after the second radio signal, calculate the receiving interval and the value based on the received radio signal and at least two signals among the plurality of radio signals that are previously received from the device, estimate a time period in which another radio signal, of the plurality of radio signals, is subsequently received from the device based on the calculated receiving interval and the calculated value, and activate the receiver during the estimated time period.

10. The communication device according to claim 9, wherein the processor is configured to cause the receiver to be set to be in a stopped state in a period of time before the estimated time period.

11. The communication device according to claim 9, wherein the processor is further configured to cause the receiver to be set to be in a stopped state in a period of time before the estimated time period.

12. The communication device according to claim 11, wherein the activating the receiver sets the receiver to be in an operating state, and wherein the processor is configured to switch the receiver from the operating state to the stopped state when a radio signal, of the plurality of radio signals, transmitted from the device is received by the receiver.

13. The communication device according to claim 11, wherein the activating the receiver sets the receiver to be in an operating state, and wherein the processor is further configured to set the receiver to be in the operating state at a timing at which each of the plurality of radio signals is transmitted from the communication device, the timing being computed based on the estimated time period.

14. A non-transitory computer-readable recording medium storing a program that causes a processor included in a communication device to execute a process, the process comprising:

of a plurality of radio signals received through the receiver from a device that transmits a plurality of radio signals while shifting timing at random by a value with respect to a receiving interval, for each of the plurality of radio signals after the second radio signal, calculating the receiving interval and the value based on the received radio signal and at least two signals among the plurality of radio signals that are previously received from the device;

estimating a time period to subsequently receive another radio signal from the device based on the calculated receiving interval and the calculated value; and activating the receiver during the estimated time period.

15. The recording medium according to claim 14, the process further comprising causing the receiver to be set to be in a stopped state in a period of time other than each of timings at which the plurality of radio signals are received, based on the estimated time period.

16. The recording medium according to claim 15, wherein the activating the receiver sets the receiver to be in an operating state, and wherein setting the receiver to be in the stopped state includes switching the receiver from the operating state to the stopped state when a radio signal, of the plurality of radio signals, transmitted from the device is received by the receiver.

17. The recording medium according to claim 15, wherein the activating the receiver sets the receiver to be in an operating state, and wherein setting the receiver to be in the operating state includes setting the receiver to be in the operating state at a timing at which each of the plurality of radio signals is transmitted from the communication device, the timing being computed based on the estimated time period.

* * * * *